US 8,587,406 B2

(12) United States Patent
Maltseff

(10) Patent No.: US 8,587,406 B2
(45) Date of Patent: Nov. 19, 2013

(54) RFID TAGS WITH ORTHOGONAL COMMUNICATION CAPABILITIES, AND ASSOCIATED SYSTEMS

(75) Inventor: Paul A. Maltseff, Woodinville, WA (US)

(73) Assignee: Intermec IP Corp., Everett, WA (US)

( * ) Notice: Subject to any disclaimer, the term of this patent is extended or adjusted under 35 U.S.C. 154(b) by 646 days.

(21) Appl. No.: 12/446,442

(22) PCT Filed: Apr. 10, 2007

(86) PCT No.: PCT/US2007/066323
§ 371 (c)(1),
(2), (4) Date: Jun. 29, 2010

(87) PCT Pub. No.: WO2008/027623
PCT Pub. Date: Mar. 6, 2008

(65) Prior Publication Data
US 2010/0271179 A1    Oct. 28, 2010

Related U.S. Application Data

(60) Provisional application No. 60/841,737, filed on Sep. 1, 2006.

(51) Int. Cl.
*G08C 17/00* (2006.01)
*H04W 4/00* (2009.01)
*H04M 1/00* (2006.01)
*H04Q 5/22* (2006.01)

(52) U.S. Cl.
USPC ........ 340/10.1; 340/10.4; 340/10.5; 370/328; 375/260

(58) Field of Classification Search
CPC .......... G08C 17/00; H04W 4/00; H04M 1/00
USPC ............... 340/10.1–10.5, 5.61; 370/229, 235, 370/328, 311; 375/349, 345, 350, 260, 338, 375/474; 455/550.1, 552.1, 574
See application file for complete search history.

(56) References Cited

U.S. PATENT DOCUMENTS

| 4,442,527 | A | 4/1984 | Munday |
| 5,077,753 | A | 12/1991 | Grau, Jr. et al. |
| 5,940,006 | A | 8/1999 | MacLellan et al. |
| 6,115,426 | A * | 9/2000 | Fujimoto et al. ............. 375/260 |
| 6,127,917 | A | 10/2000 | Tuttle |
| 6,177,861 | B1 | 1/2001 | MacLellan et al. |
| 6,384,712 | B1 | 5/2002 | Goldman et al. |

(Continued)

OTHER PUBLICATIONS digitalradiotech.co.uk, Coded Orthogonal Frequency Division Multiplexing (COFDM), http://www.digitalradiotech.co.uk.cofdm.htm, accessed Apr. 2, 2007, 20 pages.

(Continued)

*Primary Examiner* — Nam V Nguyen
(74) *Attorney, Agent, or Firm* — Perkins Coie LLP

(57) ABSTRACT

An apparatus for use in an RFID data collection system includes an antenna portion for wirelessly exchanging signals and a memory portion for storing RFID data. A signal processing portion is coupled among the antenna portion and the memory portion. The signal processing portion is configured to receive RFID data and to at least encode or decode the received RFID data via at least two orthogonal modulation signals. Other configurations are also disclosed.

24 Claims, 5 Drawing Sheets

(56) References Cited

U.S. PATENT DOCUMENTS

| | | | |
|---|---|---|---|
| 6,865,237 B1 | 3/2005 | Boariu et al. | |
| 7,017,639 B2 | 3/2006 | McDonald | |
| 7,019,639 B2 | 3/2006 | Stilp | |
| 7,023,817 B2 | 4/2006 | Kuffner et al. | |
| 7,242,293 B2* | 7/2007 | Rea et al. | 340/539.11 |
| 7,359,466 B2* | 4/2008 | Huang et al. | 375/349 |
| 7,398,932 B2* | 7/2008 | Ashili et al. | 235/492 |
| 7,423,961 B2* | 9/2008 | Ogawa et al. | 370/210 |
| 7,599,325 B2* | 10/2009 | Lin et al. | 370/328 |
| 7,609,780 B2* | 10/2009 | Sadowsky | 375/297 |
| 7,693,111 B2* | 4/2010 | Sondur et al. | 370/332 |
| 7,756,548 B2* | 7/2010 | Laroia et al. | 455/561 |
| 7,804,907 B2* | 9/2010 | Nagai | 375/260 |
| 8,315,191 B2* | 11/2012 | Glazko et al. | 370/310 |
| 2004/0179588 A1 | 9/2004 | Kuffner et al. | |
| 2005/0237184 A1 | 10/2005 | Muirhead | |
| 2006/0045194 A1* | 3/2006 | Athanasios et al. | 375/260 |
| 2006/0071807 A1 | 4/2006 | Sadowsky | |
| 2007/0059901 A1 | 3/2007 | Majumdar et al. | |
| 2007/0126585 A1 | 6/2007 | Okunev et al. | |
| 2007/0229261 A1 | 10/2007 | Zimmerman et al. | |
| 2008/0113632 A1 | 5/2008 | Chae et al. | |
| 2010/0214065 A1 | 8/2010 | Maltseff et al. | |
| 2010/0277318 A1 | 11/2010 | Maltseff | |

OTHER PUBLICATIONS

Edfors et al., "An Introduction to Orthogonal Frequency-Division Multiplexing," Sep. 1996.

Gesbert et al., "Breaking the barriers of Shannon's capacity: An overview of MIMO wireless systems," Telenor's Journal: Telektronikk, Department of Informatics, University of Oslo, Norway, Jan. 2002, 9 pages.

HP New Release, "HP Unveils Revolutionary Wireless Chip that Links the Digital and Physical Worlds," http://www.hp.com/hpinfo/newsroom/press/2006/060717a.html, Palo Alto, California, Jul. 17, 2006, 2 pages.

International Search Report and Written Opinion, International Application No. PCT/US07/66323, Applicant: Intermec IP Corp., mailed Oct. 6, 2008, 12 pages.

Jun Shi, Richard D. Wesel, Channel-Eigenvector Invariant Space Time Constellations, UCLA, 2004, Los Angeles, California, 5 pages.

S.M. Alamouti, A Simple Transmit Diversity Technique for Wireless Communication, IEEE Journal on Select Areas in Communication, vol. 16, No. 8, Oct. 1998, 7 pages.

Yu Chang, Yigbo Hua, Xiang-Gen Xia, and Brian Sadler, "An insight into space-time block codes using Hurwitz-Radon families of matrices," Science Direct, www.sciencedirect.com, 2008, 33 pages.

* cited by examiner

RFID TAGS WITH ORTHOGONAL COMMUNICATION CAPABILITIES, AND ASSOCIATED SYSTEMS

CROSS-REFERENCE TO RELATED APPLICATIONS

This application claims the benefit of U.S. Provisional Patent Application No. 60/841,737, filed Sep. 1, 2006.

BACKGROUND

RFID (radio frequency identification) technology has gained momentum in the last decade as a solution for tracking resources in supply chain logistics. The ever increasing demands for data have drawn the attention to the search of new approaches for communication between RFID tags and readers to decrease the communication time between every particular tag and reader. For example, Hewlett Packard Corp. has unveiled a new wireless chip capable to communicate with the speed up to 10 Megabits per second. See, *HP Unveils Revolutionary Wireless Chip that Links the Digital and Physical Worlds—Grain-sized chip could be attached to almost any object, making information more ubiquitous*, HP Press Release from Jul. 17, 2006. However, the communication distance for this device is limited to a few inches due to the employment of inductive coupling for harvesting energy and communication.

DETAILED DESCRIPTION

Benefits in RFID technology can be realized by employing orthogonality of modulating signals and other communication techniques described herein to increase the communication range and robustness with RFID tags, while decreasing communication time so that more tags can be read within a given period of time. By using, for example, orthogonal frequency division multiplexing (OFDM) techniques at the tag, and employing more sophisticated processing at the RFID reader, these and other benefits may be realized with RFID data collection. Briefly, and in general terms, aspects of the present invention provide a new approach for communications between RFID tags and readers based on the application of orthogonality of modulation signal paradigms for communications between tags and readers, including using multiple antennas. As a result, a reader can read multiple tags simultaneously, with each tag employing orthogonal communications.

Various embodiments or examples of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
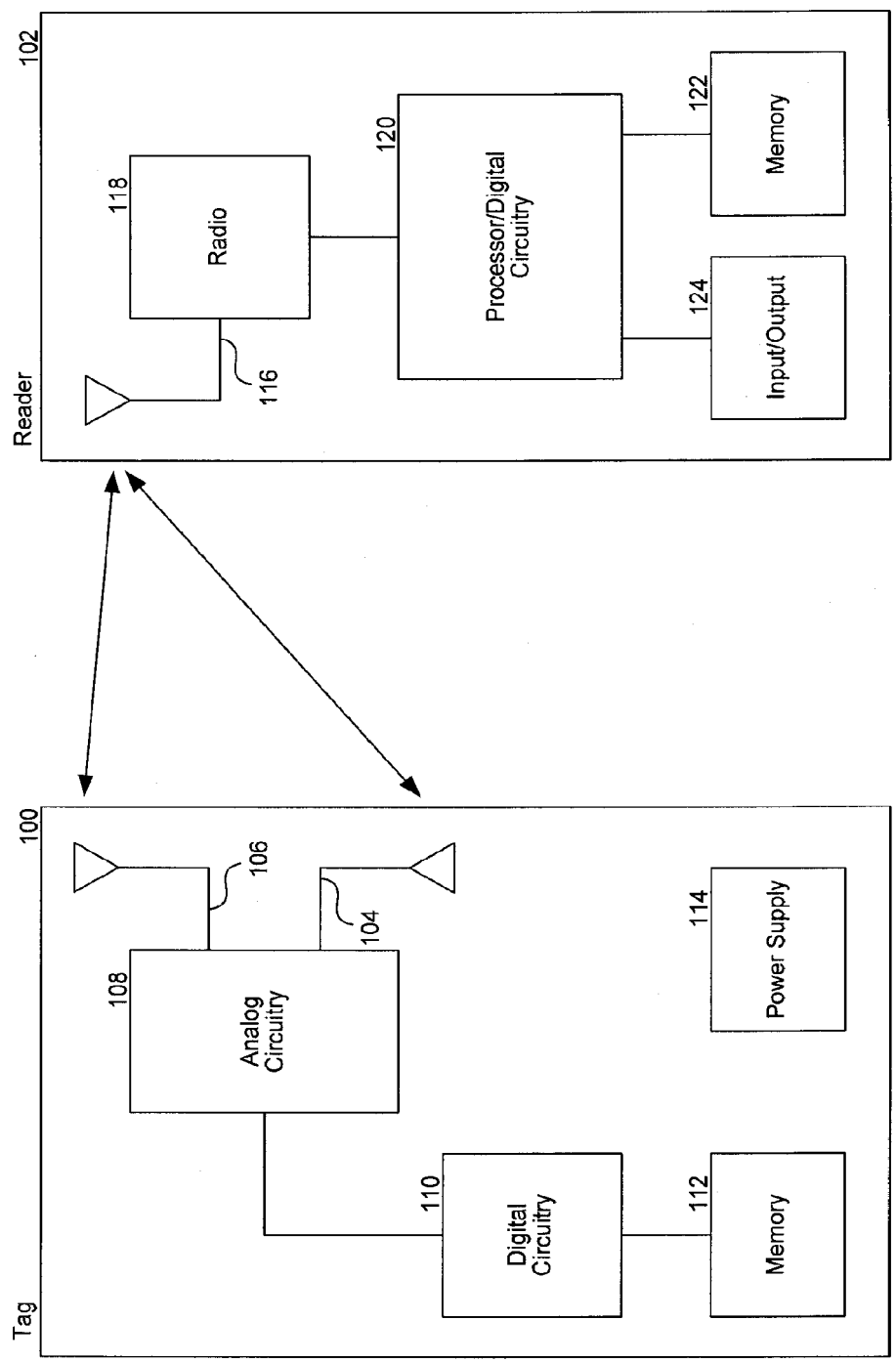
FIG. 1 is a block diagram showing an example of a RFID tag and associated reader employing aspects of the invention.

Referring to FIG. 1, an example of an RFID tag 100 and reader 102 is shown. The tag 100 in this example includes two tag antennas 104 which receive signals from and transmit signals to the reader 102. As explained below, the two (or more) antennas may provide for two independent channels employing orthogonal modulation. The antennas may be formed on a substrate for the tag, and be of any known form. For example, each antenna may be tuned to a different frequency. Tag analog circuitry 108, coupled to the tag antennas, provides for data transfer with the reader by modulating a signal for transmission and receiving signals from the reader. Digital circuitry 110, coupled to the tag analog circuitry, can be of many types, including dedicated logic devices, gate arrays, a microprocessor, or other digital signal processing circuitry, together with any necessary software/firmware. The digital circuitry communicates with memory 112, which can be of any form, such as read-only memory (ROM), random access memory (RAM), non-volatile memory such as EEPROM, Flash, etc. The memory may store one or more subcarrier codes or frequencies for transmitting data signals, symbol mapping data, etc., all associated with the tag. The tag may also include other circuitry, such as forward error correction (FEC) circuitry, interleaver circuitry, symbol mapping circuitry, inverse fast Fourier transform circuitry, cyclic prefix insertion circuitry, filter circuitry, block encoder, and other components used in OFDM or coded OFDM (COFDM) transmissions. (While the terms "OFDM communications," "OFDM techniques," and the like are sometimes used below, they generally relate to the use of communications employing multiple carriers representing multiple channels, but not necessarily using all mutually orthogonal frequencies.) The analog circuitry 108, digital circuitry 110 and memory 112 may be formed on a single semiconductor chip or device.

A power supply 114 defines a type of tag. For example, the power supply can be a battery, making the tag 100 an active tag. Alternatively, the power supply can be energy storage circuitry to permit the tag to passively harvest and store electromagnetic energy received from the reader 102. The tag 100 can also be a hybrid tag that employs both passive and active features. If the tag were active/hybrid, them a more powerful radio/modulator may be employed, such as one which uses eight or more orthogonal carriers.

The reader 102 includes an antenna 116 coupled to a radio 118. A memory 122 of the reader 102 stores data received from the tag, as well as instructions for operating the reader. A processor or digital circuitry 120 communicates with the radio to provide appropriate signals to the tag 100, and receive data therefrom. For example, as described herein, the processor/digital circuitry 120 may include a discrete Fourier transform component, cyclic prefix deletion circuitry, or other detector/decoder circuitry (or associated software or firmware to perform these functions) so as to process received orthogonal modulation signals (e.g., OFDM signals) from the tag 100. The reader may employ any known receiver and decoder or detector, such as a maximum likelihood detector or orthogonal matched filter detector.

The reader 102 may employ input/output circuitry 124, which can be any of a variety of devices or circuitry. For example, the reader may include a trigger or button when employed as a hand-held reader (often with a portable power source), as well as include a display, speakers and/or output port for wired connection with an external computer or network. Alternatively, the reader could include any of a variety of sensors to cause the reader to automatically enter a reading or interrogation mode based on a signal from one or more sensors.

The reader 102 can, of course, be of any possible configuration known in the RFID field. Alternatively or additionally, the reader may employ OFDM encoding circuitry or instructions to encode and transmit data using OFDM encoding to tags or external receivers. While the system of FIG. 1 is shown with a tag having two antennas and a reader having a single antenna, other alternatives are possible, so long as the tag or the reader employ orthogonal communications, such as orthogonal modulation, OFDM, or multi-carrier modulation.

In operation, the tag 100 can operate normally using existing RFID standards, but can also operate under an alternative communication node employing, e.g., OFDM coding, as described herein. Thus, the tag can provide an initial communication to the reader indicating that the tag is capable of OFDM communications, and thus the reader can begin using OFDM communication techniques with the tag (e.g., with appropriate decoding). Alternatively, the tag can have no standard operating protocol, and work only in a OFDM mode.

Figure 2:
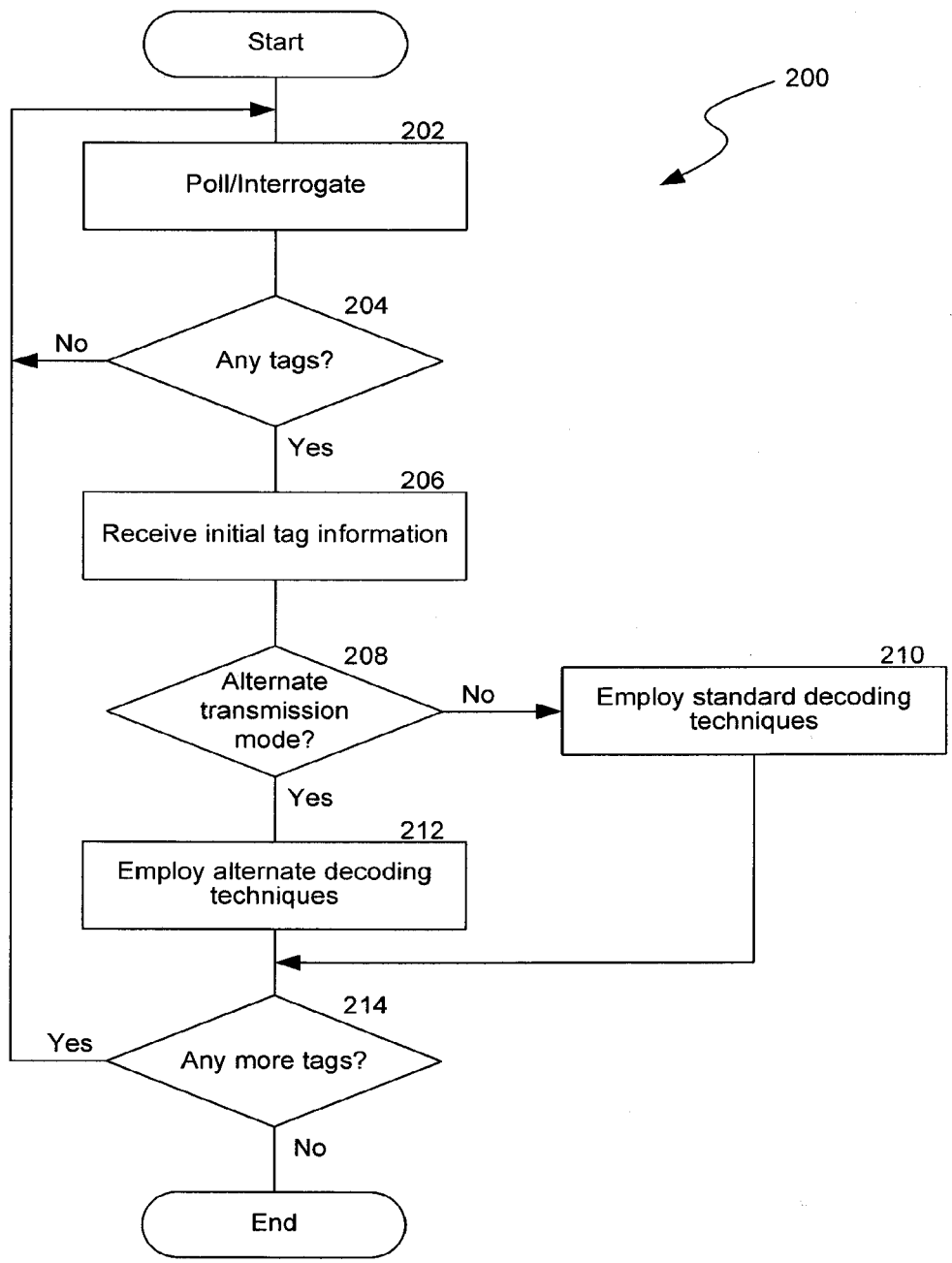
FIG. 2 is a flow diagram illustrating an example of a routine performed by the reader for reading the RFID tag of FIG. 1.

Referring to FIG. 2, an example of a routine 200 stored in the memory 112 of the reader 102 is shown for handling RFID tags employing two or more forms of alternate coding or modulation. The routine 200 can be created as computer-executable instructions that may be interpreted not only by the reader or other specialized device, but also a general-purpose computer. The routine may be not only stored in the memory 122, but also stored and distributed on computer-readable media, including magnetically or optically readable computer disks, hard-wired or preprogrammed chips (e.g., EEPROM semiconductor chips), nanotechnology memory, biological memory, or any other data storage media. Indeed, computer implemented instructions, and other aspects of the invention may be distributed over the Internet or over other networks (including wireless networks), or on a propagated signal on a propagation medium (e.g., an electromagnetic wave, sound wave, etc.) over a period of time, or they may be provided on any analog or digital network (packet switched, circuit switched, or other scheme). Thus, aspects of the routine may be not necessarily performed on a single device (e.g., the reader), but be distributed among two or more networked devices.

Beginning in block 202, the reader 102 polls or interrogates an area to identify any nearby RFID tags. If any tags are present (block 204), then the reader receives some initial information from the tag (e.g., a flag or header data), such as the tag 100 (block 206). The reader then determines from this initial information whether the tag is capable of any alternate transmission mode (block 208), and if not, employs standard decoding techniques known in the RFID field (block 210).

However, if the tag employs an alternate transmission mode, then the reader may employ alternate decoding techniques, such as the OFDM communication techniques as well as associated functions as described herein (block 212). The tags may be relatively unsophisticated relative to the reader, which may employ much more sophisticated and complex processing for signal acquisition and decoding. If any more tags are present (block 214), then the process loops back to block 202, otherwise, the process ends.

Figure 3:
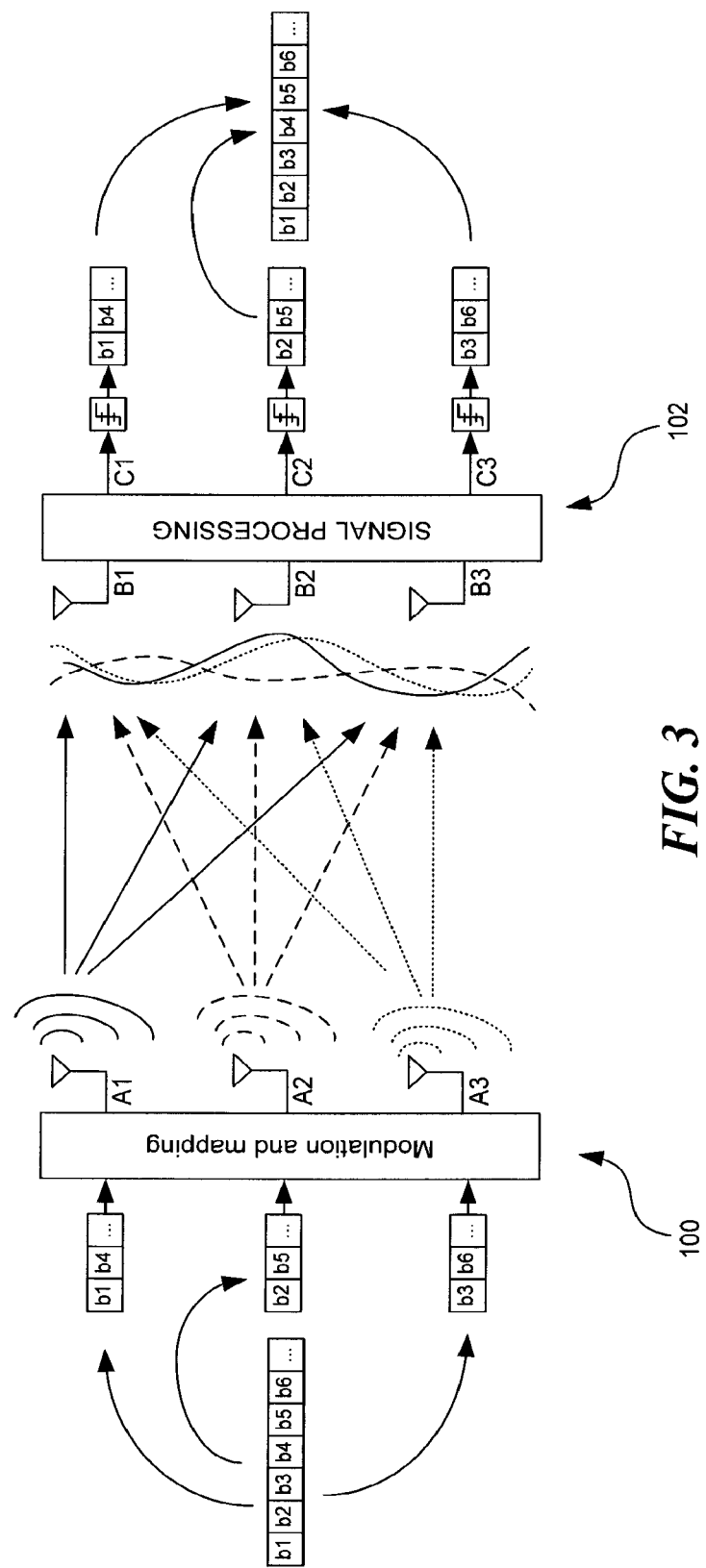
FIG. 3 is showing a general view of MIMO communication between RFID tag and reader.

Importantly, by using orthogonal or OFDM communication techniques, the reader may simultaneously, or substantially simultaneously, read multiple tags. An approach to further boost the communication rate between the RFID tag and the reader is to employ multiple-transmit and multiple-receive antennas, i.e., multiple-input multiple-output (MIMO) techniques. FIG. 3 shows an example of such a MIMO alternative. As shown in this example, both the tag and the reader have three antennas each. Alternative embodiments may include more or less antennas for each component. (FIG. 3 also show interleaving of symbols at the transmitter/tag, and de-interleaving at the receiver/reader.)

A MIMO system with $N_T$ transmitting antennas and $N_R$ receiving antennas may be described as follow:

$$r(t) = Gs(t) + n(t), \quad (1)$$

where $r(t)$ is a $(N_R, 1)$ vector of received signal; G is a $(N_T, N_R)$ channel transfer matrix; $n(t)$ is a $(N_R, 1)$ vector describing noise and interference; and $s(t)$ is a $(N_T, 1)$ vector or transmitted signal. For an RFID tag with two antennas and a reader with two antennas, (1) will be in the form of $$\left\| \begin{matrix} r_1 \\ r_2 \end{matrix} \right\| = \left\| \begin{matrix} g_{11} & g_{1,2} \\ g_{21} & g_{22} \end{matrix} \right\| \left\| \begin{matrix} s_1 \\ s_2 \end{matrix} \right\| + \left\| \begin{matrix} n_1 \\ n_2 \end{matrix} \right\|$$

Since RFID tags (active or passive) are typically designed to be relatively simple and inexpensive devices, their processing capability should also be limited. The simplicity of the tags may be achieved by orthogonality as an underlying concept of communication between tags and readers.

Two approaches to implement orthogonality on a physical level for RFID tags are:
1. Utilization of orthogonal modulation functions for transmission and/or receiving channels; and
2. Application of orthogonal frequency division multiplexing.

Orthogonal Modulation for Transmission/Reception

Formally, functions $f_i(t)$ and $f_j(t)$ are orthogonal if their inner product is zero, $$\langle f_i, f_j \rangle \int_a^b f_i(t) f_j(t) dt = \delta_{ij},$$

where $$\delta_{ij} = \begin{cases} 1, & \text{if } i = j; \\ 0, & \text{if } i \neq j. \end{cases}$$

Common examples of orthogonal functions are trigonometric functions such as $$\int_{-\pi}^{\pi} \sin mx * \cos nx \, dx = 0 \text{ for all integers } m, n$$

and $$\int_{-\pi}^{\pi} \sin mx * \sin nx \, dx = \int_{-\pi}^{\pi} \cos mx * \cos nx \, dx = \begin{cases} \pi, & n = m \\ 0, & n \neq m \end{cases}.$$

Figure 4:
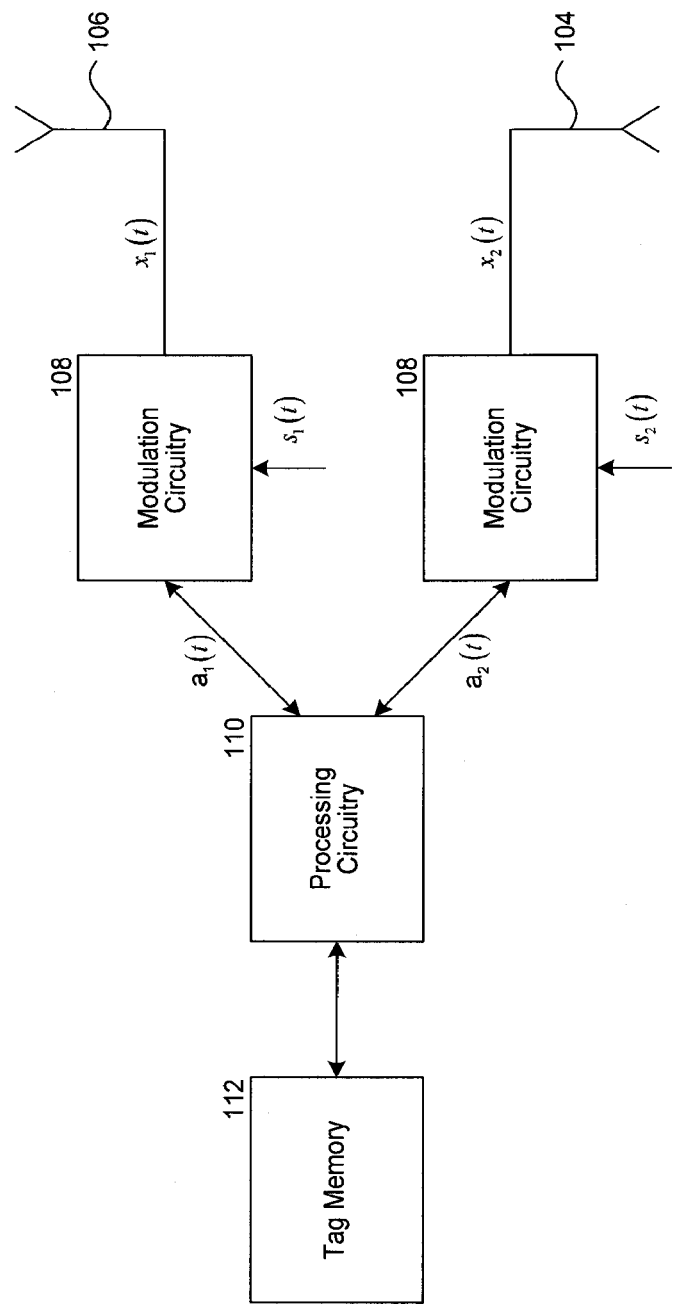
FIG. 4 is showing a general view of RFID tag implementing parallel transmission using two orthogonal channels and two tag antennas.

An RFID tag may employ two antennas operationally connected to two modulating channels. If the modulating signals $s_1(t)$ and $s_2(t)$ are orthogonal, $$\int_{-\pi}^{\pi} s_1(t) * s_2(t) dx = 0,$$

the mutual interference would be insubstantial. FIG. 4 shows an example of a tag employing two transmit antennas with an orthogonal transmit modulation for the tag by employing orthogonal modulating signals $s_1(t)$ and $s_2(t)$.

The receiver in the reader can be implemented using an orthogonal matched filter detector, which will be matched to a set of orthogonal signals closed in a least square sense to the transmitted signals $x_1(t)$ and $x_2(t)$. In another words, the received signals (1) will be cross correlated with a set of normalized signals $h_j(t) \in H$, $\hat{s}_k(t) = \langle h_j(t), r(t) \rangle$. The transmitted signal $x_i(t)$ is defined or estimated from $$i = \arg\max_k \hat{s}_k(t).$$

Therefore, the selected or estimated signal, as determined by the reader, will be the transmitted signal $x_i(t)$ if $$\max_j \langle h_j(t), Gx_i(t) \rangle \langle h_i(t), Gx_i(t) + n(t) \rangle.$$

Figure 5:
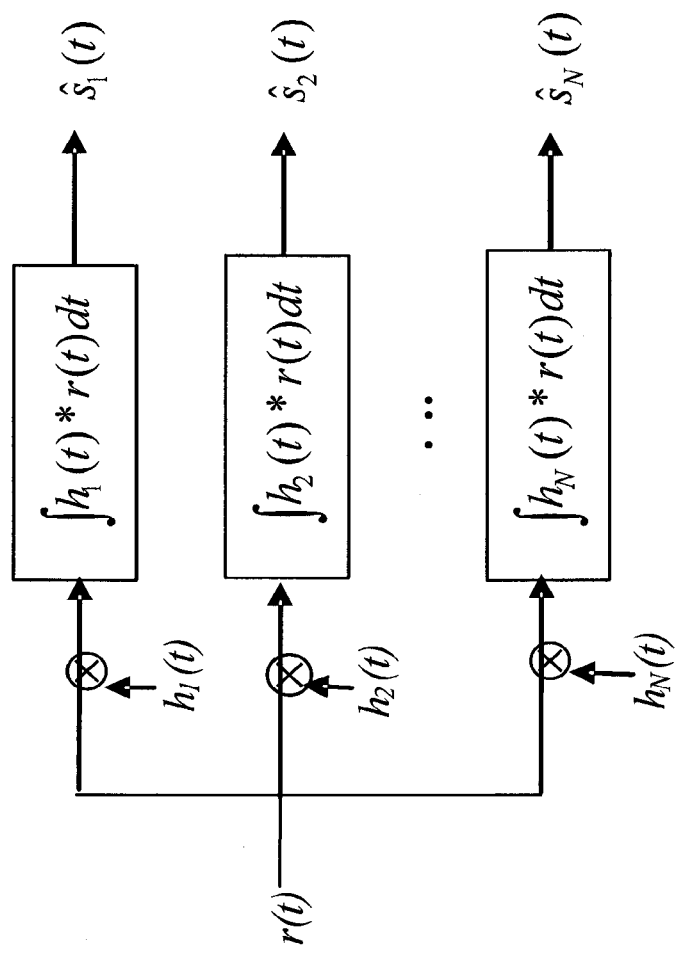
FIG. 5 is a block diagram illustrating an example of a correlator that may be employed by the reader of FIG. 1.

An example of a correlation scheme is shown in FIG. 5. As shown, the received signal r(t) is input to multiple parallel correlators, each for the two or more tag transmission channels, and each integrating the received signal based on normalized signals $h_i(t)$. Each correlator then outputs a signal estimate $\hat{s}_i(t)$ to a detector/decoder (not shown).

Orthogonal Frequency Division Multiplexing

OFDM is typically a block transmission technique. Since an OFDM signal consists of N orthogonal carriers modulated by N parallel data streams, one OFDM symbol may be presented as $$X(t) = \frac{1}{\sqrt{N}} \sum_{k=0}^{N-1} x_k e^{j2\pi f_k t}, \quad 0 < t < N, \tag{2}$$

where $x_k$ is a data symbol taken from a modulation constellation and $e^{j2\pi f_k t}$ are N orthogonal carriers. For example, in the case of two carriers, (2) will be as follows:

$$X(t) = \frac{1}{\sqrt{2}} (x_0 e^{j2\pi f_0 t} + x_1 e^{j2\pi f_1 t}). \tag{3}$$

Sampling on the receiving device of N points of OFDM symbol, results in the following $$X(nT) = \frac{1}{\sqrt{N}} \sum_{k=0}^{N-1} x_k e^{j2\pi \frac{nk}{N}}, \quad n = 0, 1, \ldots N-1. \tag{4}$$

For example, in the case of two orthogonal carriers, (4) will be reduced to the following:

$$X(nT) = \frac{1}{\sqrt{2}} (x_0 + x_1 e^{j2\pi \frac{n}{N}}), \quad n = 0, 1, \ldots N-1.$$

Note that the implementation of (3) on the tag does not add a substantial complexity, and the reader or receiving device will be required to perform a small amount of additional calculations.

While the system is generally described above as employing OFDM techniques, an alternative system may use COFDM. Of course, the system may employ any orthogonal communication capabilities in the tag/reader, under aspects of the present invention.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C §112, sixth paragraph, other aspects may likewise be embodied as a means-plus-function claim. (Any claims intended to be treated under 35 U.S.C. §112, sixth paragraph will begin with the words "means for".) Accordingly, the inventors reserve the right to add additional claims after filing the application to pursue such additional claim forms for other aspects of the invention.

I claim:

1. A radio frequency identification (RFID) tag, comprising:
a tag substrate;
at least two antennas formed on the substrate;
a memory, received by the substrate, for storing RFID data;
processing circuitry and modulation circuitries received by the substrate and coupled among the antennas and the memory,
wherein the processing circuitry and modulation circuitries are configured to:
generate an initial communication;
receive at least some of the stored RFID data, and
encode the received RFID data using orthogonal frequency division multiplexing (OFDM) to modulate the received data onto two or more orthogonal subcarriers;
wherein the processing circuitry and modulation circuitries are further configured to direct at least one antenna of the antennas formed on the substrate to transmit the initial communication to an RFID reader using a non-OFDM communications mode, and
wherein the initial communication indicates that the RFID tag is configured to transmit the received RFID data using an OFDM communications mode.

2. The RFID tag of claim 1 wherein at least one antenna of the antennas formed on the substrate transmits the OFDM encoded signal.

3. The RFID tag of claim 1 wherein the RFID tag is an active tag.

4. The RFID tag of claim 1 wherein the processing circuitry and modulation circuitries are further configured to receive and process OFDM encoded signals.

5. A radio frequency identification (RFID) reader, comprising:
antenna means for wirelessly exchanging signals;
a memory means for storing data; and
processing and modulation circuitry means, coupled among the antenna means and the memory means, for receiving an initial communication and RFID data stored in RFID tags,
wherein the received RFID tag data is encoded using orthogonal modulation signals, and
wherein the processing and modulation circuitry means further comprise means for decoding the received RFID tag data encoded using the orthogonal modulation signals, and
means for processing the initial communication to determine that the RFID tag is configured to transmit the received RFID tag data using an orthogonal communications mode, and
wherein the initial communication is received in a non-orthogonal communications mode.

6. The RFID reader of claim 5 wherein the antenna means comprises at least two antennas, and wherein the processing and modulation circuitry means include means for transmitting data using orthogonal frequency division multiplexing (OFDM) encoding.

7. The RFID reader of claim 5 wherein the processing and modulation circuitry means comprise means for communicating with RFID tags to determine if the orthogonal communications are coded orthogonal frequency division multiplexing (COFDM) before entering the orthogonal communications mode.

8. A semiconductor device for use in a radio frequency identification (RFID) tag, the device comprising:
encoder circuitry that receives incoming data stored by the RFID tag and converts the stored RFID data into at least one transmitting signal that employs two or more orthogonal modulation signals
processing circuitry that generates an initial communication signal that does not employ orthogonal modulation signals; and,
an output portion for outputting the RFID tag data, as the at least one transmitting signal that employs the two or more orthogonal modulation signals, to be transmitted by the RFID tag and
wherein the initial communication signal that does not employ orthogonal modulation signals.

9. The semiconductor device for use with the RFID tag of claim 8 wherein the encoder circuitry employs orthogonal frequency division multiplexing (OFDM).

10. The semiconductor device for use with the RFID tag of claim 8 wherein the encoder circuitry employs two or more orthogonal trigonometric functions as the two or more orthogonal modulation signals.

11. The semiconductor device for use with the RFID tag of claim 8 wherein the encoder circuitry employs two orthogonal modulation signals.

12. The semiconductor device for use with the RFID tag of claim 8 wherein the RFID tag includes at least two spatially separated transmitting antennas, and wherein the encoder circuitry employs two orthogonal modulation signals, each associated with one of the two antennas.

13. The semiconductor device for use with the RFID tag of claim 8, further comprising memory, coupled to the encoder circuitry, for storing the RFID tag data and data associated with two or more subcarriers for permitting the encoder circuitry to produce the two or more orthogonal modulation signals.

14. An apparatus for use in a radio frequency identification (RFID) data collection system, the apparatus comprising:
an antenna portion for wirelessly exchanging signals;

a memory portion for storing RFID data;
a signal processing portion coupled among the antenna portion and the memory portion,
  wherein the signal processing portion is configured to receive RFID data and to at least encode or decode the received RFID data via at least two orthogonal modulation signals that are mutually orthogonal to each other with respect to the RFID data collection system; and
  wherein the signal processing portion is further configured to transmit or receive an initial communication in a non-orthogonal communications mode, and
  wherein the initial communication indicates that an RFID tag is configured to transmit the received RFID data using an orthogonal communications mode.

15. The apparatus of claim 14 wherein the apparatus is the RFID tag, wherein the antenna portion includes at least two antennas, and wherein the signal processing portion is configured to encode the received RFID data via the least two orthogonal modulation signals.

16. The apparatus of claim 14 wherein the apparatus is an RFID tag reader, wherein the antenna portion includes at least two antennas, and wherein the signal processing portion is configured to decode the received RFID data via the least two orthogonal modulation signals.

17. A computer-readable medium whose contents cause at least one device to perform a method for decoding data received from a radio frequency identification (RFID) tag, the method comprising:
  receiving initial RFID data from the RFID tag in a non-orthogonal communications mode,
    wherein the initial RFID data indicates that the RFID tag is configured for orthogonal communications;
  determining that orthogonal communications are possible based on the initial RFID data;
  entering an orthogonal communications mode responsive to determining that the orthogonal communications are possible;
  receiving subsequent RFID data from the RFID tag in the orthogonal communications mode,
    wherein the subsequent RFID tag data is encoded using mutually orthogonal signal encoding;
  decoding the mutually orthogonal encoded RFID tag data; and,
  outputting the decoded mutually orthogonal encoded RFID tag data for data storage or automated data processing.

18. The computer-readable medium of claim 17 wherein the method further comprises initially communicating with the RFID tag to determine whether the RFID tag can provide coded orthogonal frequency division multiplexing (COFDM) encoded RFID tag data.

19. A wireless data collection system comprising:
  a radio frequency identification (RFID) tag having at least one antenna;
  an RFID reader module having at least one antenna and configured to exchange wireless communications with the RFID tag; and,
    wherein the RFID tag is configured to transmit an initial communication in a non-orthogonal communications mode,
    wherein the initial communication indicates that the RFID tag is configured for an orthogonal communications mode,
    wherein responsive to this initial communication, at least the RFID tag or the RFID reader is configured to transmit the RFID data over a range of frequencies, and
    wherein the RFID data is spread over the range of frequencies via at least two orthogonal modulation signals.

20. The wireless data collection system of claim 19 wherein the both the RFID tag and the RFID reader module have N number of antennas, where N is greater than or equal to three.

21. The wireless data collection system of claim 19 wherein the RFID data is tag data stored in the RFID tag, and wherein the RFID tag includes an interleaver for interleaving the tag data.

22. The wireless data collection system of claim 19 wherein the RFID reader module includes orthogonal frequency division multiplexing (OFDM) encoder circuitry.

23. The wireless data collection system of claim 19 wherein the RFID reader module includes a correlator to correlate a received RFID signal received from the RFID tag with signals representing the least two orthogonal modulation signals.

24. The wireless data collection system of claim 19 wherein the RFID tag is configured to perform inverse Fourier transform functions, and wherein the RFID reader module is configured to perform Fourier transform functions.

* * * * *